(12) United States Patent
Levy et al.

(10) Patent No.: US 8,384,330 B2
(45) Date of Patent: Feb. 26, 2013

(54) METHOD OF MANAGING THE STEERING CONTROL OF AN AIRCRAFT UNDERCARRIAGE

(75) Inventors: Paul-Louis Levy, Paris (FR); Michel Basset, Heimsbrunn (FR); Gaétan Pouly, Colombes (FR); Jean-Philippe Lauffenburger, Rixheim (FR)

(73) Assignees: Messier-Bugatti-Dowty, Velizy Villacoublay (FR); Universite de Haute-Alsace, Mulhouse (FR)

( * ) Notice: Subject to any disclaimer, the term of this patent is extended or adjusted under 35 U.S.C. 154(b) by 501 days.

(21) Appl. No.: 12/686,694

(22) Filed: Jan. 13, 2010

(65) Prior Publication Data

US 2010/0181954 A1    Jul. 22, 2010

(30) Foreign Application Priority Data

Jan. 16, 2009 (FR) ...................................... 09 00190

(51) Int. Cl.
*G05B 11/01* (2006.01)
(52) U.S. Cl. ............. 318/560; 701/41; 701/49; 318/583; 180/23; 180/222; 180/400
(58) Field of Classification Search .................. 318/432, 318/560, 609, 610, 614, 583, 596; 701/41, 701/49, 56, 70; 703/8; 244/17.17, 17.19, 244/50, 51, 62, 75.1, 184, 220, 221, 227, 237, 100 R, 102 R, 103 R; 180/6.44, 23, 222, 400; 388/906; 188/71.5; 280/429
See application file for complete search history.

(56) References Cited

U.S. PATENT DOCUMENTS

| 5,859,774 | A  | * | 1/1999 | Kuzuya et al. | ................. | 700/71 |
| 6,651,771 | B2 | * | 11/2003 | Chabaan | ..................... | 180/446 |
| 7,346,443 | B2 | * | 3/2008 | Thibault | ......................... | 701/70 |
| 7,523,812 | B2 | * | 4/2009 | Thibault et al. | ............. | 188/71.5 |
| 2008/0312891 | A1 | * | 12/2008 | Maruyama et al. | ............... | 703/7 |

OTHER PUBLICATIONS

Olivier Sename, "Robust Control: Analysis and Design", EPO website: http://ep.espacenet.com GIPSAlab Control System Department INPG-CNRS WSIEG-BP 46, 38402 Saint Martin d'Heres Cedex, France.

* cited by examiner

*Primary Examiner* — Antony M Paul
(74) *Attorney, Agent, or Firm* — Sughrue Mion, PLLC

(57) ABSTRACT

The invention relates to a method of managing a steering control for a steerable portion of an aircraft undercarriage, the method comprising implementing servo-control to servo-control an electromechanical steering actuator on an angular position setpoint, wherein, according to the invention, the servo-control implements a control relationship H∞ type, the position and speed information being delivered by means of a fieldbus of deterministic type to a computer that implements the servo-control.

4 Claims, 3 Drawing Sheets

Fig.3
Prior Art
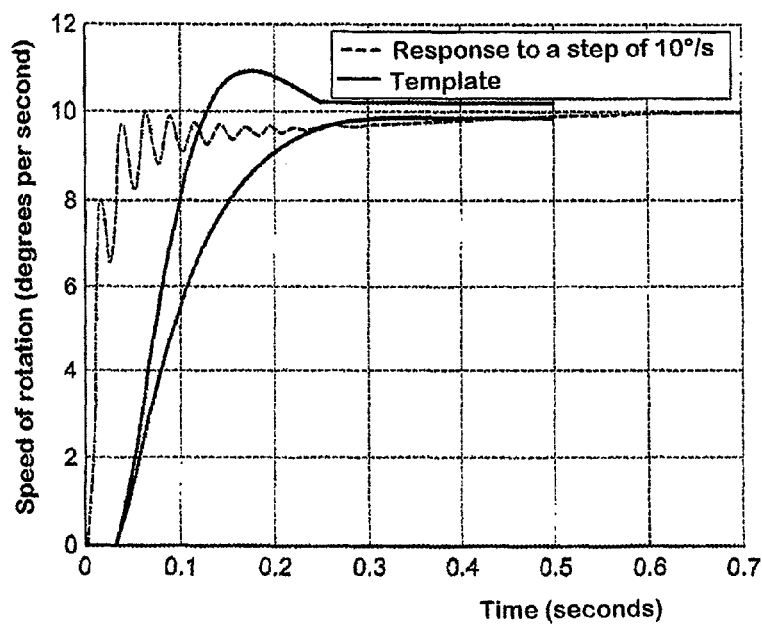
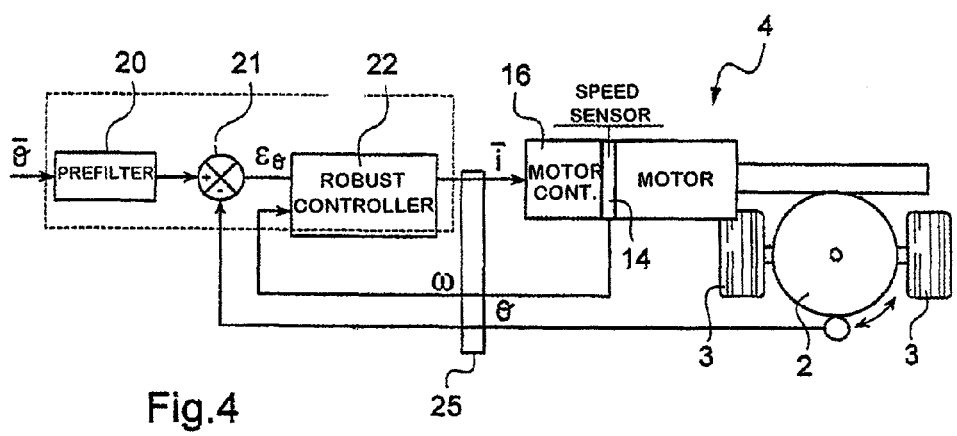
Fig.4

METHOD OF MANAGING THE STEERING CONTROL OF AN AIRCRAFT UNDERCARRIAGE

The invention relates to a method of managing the steering control of an aircraft undercarriage.

TECHNOLOGICAL BACKGROUND OF THE INVENTION

Aircraft nose undercarriages are known that include a steerable bottom portion carrying the wheels thereof. The bottom portion is steered by a steering actuator that includes at least one driving actuator, e.g. a hydraulic actuator or an electric motor adapted to cause the steerable bottom portion to pivot in response to a steering order delivered by the pilot or a by computer of the aircraft, the order specifically representing an angular position.

In the particular circumstance of electromechanical steering actuators, it is known to control the motor of the steering actuator by means of servo-control having two feedback loops, specifically an outer loop controlling position and an inner loop controlling speed. Such servo-control is performed in conventional manner by using a proportional integral derivative (PID) controller, that outputs a current setpoint for the motor of the electromechanical actuator. Also in conventional manner, the motor is associated with a controller that servo-controls the motor to the setpoint current received from the PID controller.

As a general rule, position and speed signals are delivered to the computer that implements the position servo-control by means of wire connections. Nevertheless, ever increasing consideration is being given to using a communications bus extending down along the undercarriage for the purpose of connecting the computer (generally contained within the airframe of the aircraft) to the various actuators and sensors located on the undercarriage, for the purpose of collecting and delivering data and orders necessary for implementing steering control.

In particular, it is envisaged to make use of deterministic fieldbuses of the type having time-divided multiple access, e.g. time-triggered protocol (TTP) buses. Unfortunately, such buses present a sampling interval of the order of a few milliseconds, which leads to instabilities when they are used in conjunction with PID controllers for steering control. It appears that the instability is associated with the slowness of the speed information.

An intermediate possibility would be to move the computer closer to the actuator so as to enable an internal speed feedback loop to be implemented using wires, so as to avoid the slowness of communication over the deterministic bus. Nevertheless, that computer would then be situated in a zone that is exposed and that is subjected to high levels of stress (bad weather, spray, vibration), which would require a great deal of protection to be provided.

OBJECT OF THE INVENTION

The object of the invention is to enable the steering control of an undercarriage having an electromechanical steering actuator to be controlled stably even though the signals and the orders are conveyed over a communications bus that is relatively slow.

BRIEF SUMMARY OF THE INVENTION

In order to achieve this object, there is provided a method of managing steering control of a steerable portion of an aircraft undercarriage, the method implementing servo-control to servo-control an electromechanical steering actuator on an angular position setpoint, wherein according to the invention, the servo-control implements an H∞ type control relationship, with the position and speed information needed for implementing the servo-control being delivered by means of a fieldbus of deterministic type to a computer that executes that implementation.

The invention also provides servo-control including prefiltering of the angular position setpoint for the purpose of smoothing it before it is compared with the position information.

The invention also provides prefiltering that is performed by means of a discrete interpolator of a transfer function.

The inventors have found that implementing such a control relationship in conjunction with a deterministic bus for delivering speed and position information gives rise to servo-control that is stable. In addition, such control enables the servo-control to be implemented in a computer that is remote from the controlled actuator, while still having a speed feedback loop.

Thus, the actuator and its controller can be developed independently of the computer and the associated servo-control.

BRIEF DESCRIPTION OF THE FIGURES

The invention can be better understood in the light of the following description of a particular implementation of the invention given with reference to the figures of the accompanying drawings, in which:

FIG. 3 is a diagram of the time response of a FIG. 2 servo-control to a speed step, when using a deterministic bus;

FIG. 4 is a block diagram of steering control in a particular implementation of the invention;

With reference to FIG. 1, and in known manner, the undercarriage 1 is fitted with a bottom portion 2 that is steerable and carries wheels 3. An electromechanical steering actuator 4 serves to pivot a pivot tube 5 that is connected to the steerable bottom portion 2 by a scissors linkage 6. Thus, when the electromechanical actuator 4 causes the pivot tube to pivot, that gives rise to corresponding pivoting of the steerable bottom portion 2, and thus of the wheels 3, thereby enabling the aircraft to be steered.

Figure 1:
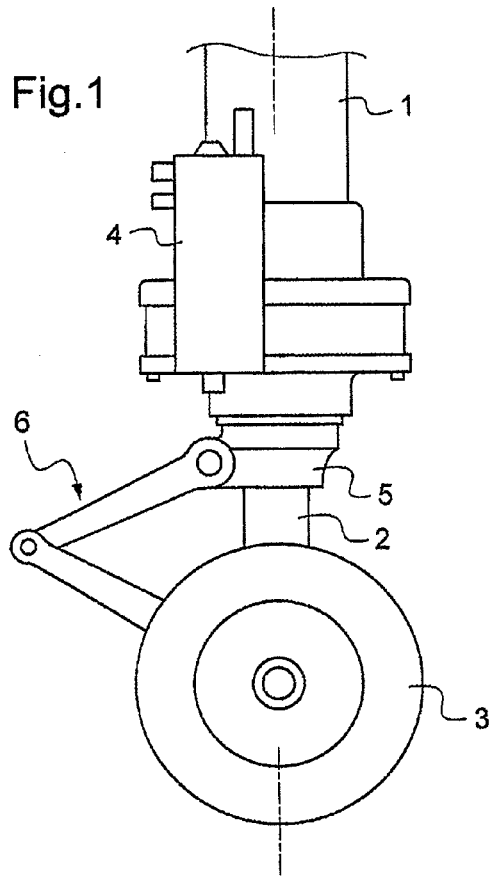
FIG. 1 is a diagrammatic view of a nose undercarriage for an aircraft, which undercarriage is provided with an electromechanical steering actuator.
Figure 2:
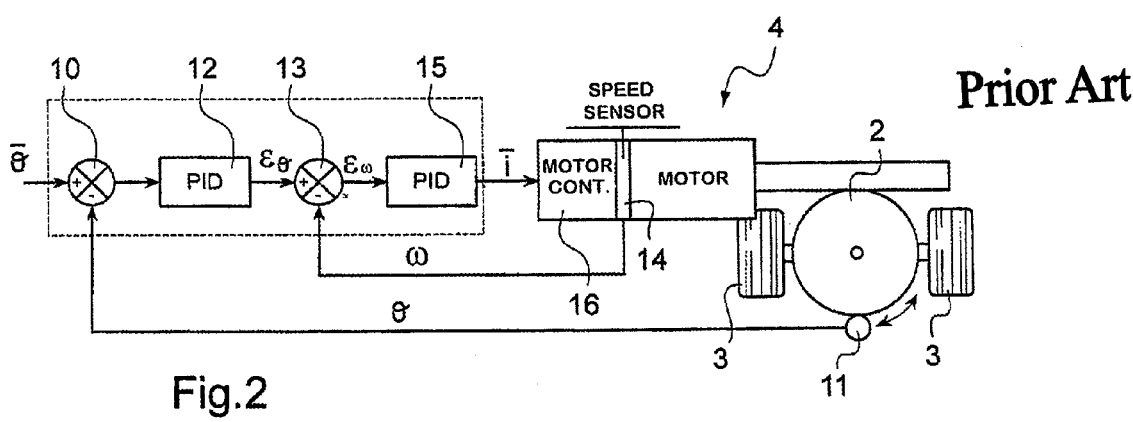
FIG. 2 is a block diagram of steering control implementing prior art servo-control based on PID controllers.

Still in known manner, the electromechanical actuator includes a motor that is generally controlled as shown in FIG. 2. An angular position setpoint $\overline{\theta}$ is sent to a comparator 10 that also receives a signal representative of the angular position θ of the steerable bottom portion, and coming from a rotation sensor 11. The comparator 10 generates a position error signal $\epsilon_\theta$ that is delivered to a first PID controller 12. This generates a speed of rotation setpoint ω for the electric motor fitted to the electromechanical actuator 4. The speed of rotation setpoint ω is delivered to a comparator 13 that also receives a signal representative of the speed of rotation of the motor, coming from a rotary speed sensor 14 installed on the motor of the actuator. The comparator 13 generates a speed error signal $\epsilon_\omega$ that is delivered to a second PID controller 15. This controller generates a current setpoint ī that is delivered to a controller 16 that controls the motor so that the current flowing through the motor is equal to the current setpoint ī.

In known implementations, the position and speed signals and also the current setpoint ī are transmitted via wire connections between the computer that implements the PID control, represented symbolically in the figure by the dashed-line rectangle, and the members concerned, such as the speed and position sensors or the motor controller.

Replacing those wire connections by a fieldbus of deterministic type raises a certain number of problems. In the intended aviation applications, it is probable that the sampling interval of such a network will be of the order of 5 milliseconds. Unfortunately, simulations implemented with such a sampling interval reveal instability, which appears to be due essentially to the interval at which the speed signal is sampled, which interval is too long.

FIG. 3 shows how a steering system that is servo-controlled by the servo-control shown in FIG. 2 responds to a step change of speed. The servo-control is adjusted using the conventional Ziegler-Nichols method. It can be seen that not only does the response depart from the specified template (continuous line curves), but in addition it presents vibrations that are damaging to the structure of the undercarriage.

A first modification envisaged by the inventors was to avoid passing the speed signal via the fieldbus, and instead to provide a specific wire connection between the computer and the rotation speed sensor. That modification would appear to solve the problem encountered, but it naturally complicates the architecture of the steering control by requiring a wire connection to be installed in parallel with the fieldbus.

A second modification envisaged by the inventors was to split the servo-control so as to house the speed loop directly in the controller of the motor. Thus, the speed loop would become a loop that is hidden from the computer, since the speed signal is not delivered thereto by the fieldbus. The computer would then provide a speed setpoint to the motor controller, which itself would naturally need to be much more complex. In addition, the motor controller, which is generally housed as closed as possible to the motor, would then need to include the electronics that are necessary for implementing the speed loop. That configuration is therefore likewise not satisfactory.

The invention seeks to propose another solution as shown in FIG. 4, in which all of the servo-control is maintained in a separate computer. This computer continues to deliver a current setpoint to the motor controller. However it now includes a prefilter 20 that filters the position setpoint $\bar{\theta}$. The prefilter serves to smooth the position setpoint, and preferably implements a discrete interpolator having the following transfer function:

$$F(z) = \frac{z^4 - 1'}{4(z^4 - z^3)}$$

The filtered position setpoint is delivered to a comparator 21 that compares the filtered position setpoint with the position signal .theta. now delivered to the computer via the deterministic fieldbus 25, represented in the figure by a continuous-line rectangle. The comparator 21 generates a position error signal $\epsilon_\phi$ that is delivered to a robust controller, preferably of the conventional H∞ (H-infinity) type, that is well known in the art for multivariable control systems.

Figure 5:
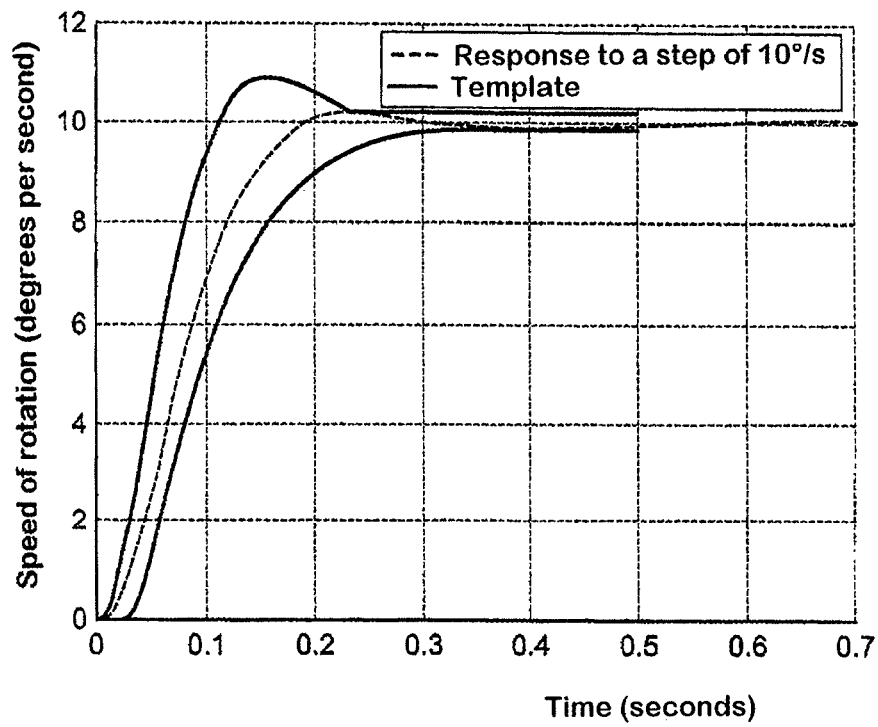
FIG. 5 is a diagram of the time response of a servo-control of FIG. 4 to the same speed step, when using a deterministic bus.

It has been found that the instability problem can be eliminated by this type of control, while enabling a deterministic fieldbus to be used, including for delivering the speed of rotation signal to the computer. By way of example, FIG. 5 shows the response to the same step change of speed as that shown in FIG. 3. It can be seen that the response is stable and lies within the specified template.

It is known that synthesizing an H∞ control requires weighting filters to be defined for the purpose of specifying the reference filter that is to be reproduced, the acceptable error, and the penalty that is acceptable on the control signal. Determining these weighting filters that enable control to be performed is a difficult problem and the weighting filters are generally determined by means of a trial and error process. Here, and according to the invention, the weighting filters are defined by means of parameters that need to be optimized, these parameters being determined using an optimization algorithm that enables the H∞ control to be adjusted automatically.

Figure 6:
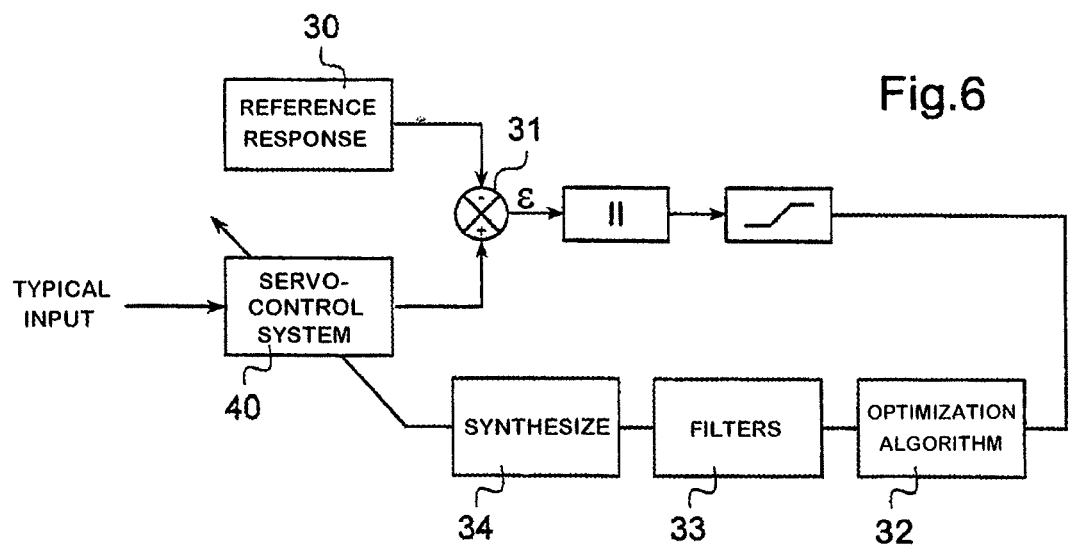
FIG. 6 is a block diagram showing the principle of adjusting the H∞ controller used in the servo-control control of FIG. 4.

More precisely, and in accordance with the diagram of FIG. 6, a reference model 30 is initially established for the undercarriage and its steering control. The reference model 30 is established in association with the specifications laid down by the aircraft manufacturer, and constitute an ideal response that the undercarriage and its steering control ought to present to a typical input. Naturally, the reference model 30 must comply with the specifications; the response of the reference model must in particular lie within a response template both in amplitude and in phase, if such a template is specified. For example, a response of the reference model could be the response shown in FIG. 5, which constitutes the response to a speed step of 10 degrees per second.

A model is also made of a servo-control system 40 that is constituted by a model of the undercarriage having the servo-control of the invention applied thereto in accordance with the diagram of FIG. 4. The model of the undercarriage is established by modeling the behavior of the tire(s), in particular how they skid at large angles. For this purpose, account is advantageously taken of the behavior of the aircraft itself, and in particular of the skidding of the tires carried by the other undercarriages, the inertia of the aircraft, . . . .

A typical input is delivered to the servo-controlled system and its response is compared with the response of the reference model 30 by means of a comparator 31 that delivers an error $\epsilon$. This error is then subjected to various processing operations, such as taking its absolute value and integrating it, prior to being delivered to an optimization algorithm 32.

The optimization algorithm 32 progressively modifies the parameters of the weighting filters 33. These parameters are delivered to a control synthesizer 34 that synthesizes the H∞ control used in the servo-control system 40. The optimization algorithm 32 seeks to minimize the error signal $\epsilon$ so as to cause the servo-control system to respond as closely as possible in the same manner as the reference model 30. Preferably, the optimization algorithm is an algorithm of the genetic type, since that appears under these circumstances to give good results. In particular, the inventors have found that such an algorithm makes it possible to find optimum parameters for weighting filters for a wide variety of constraints.

The management of steering control in accordance with the invention presents several advantages:

it is possible to synthesize control for the specified template(s). The weighting filters are adjusted automatically to take account of the desired response templates;

it is possible to keep all of the high-level servo-control (speed and position loops) in a separate computer, sheltered within the aircraft fuselage, leaving the motor controller to perform low-level servo-control only (servo-controlling the current to the current setpoint as delivered by the computer); and it has been found that an H∞ control of limited degree (fifth degree) suffices to satisfy the specifications normally laid down by aircraft manufacturers concerning the performance of steering controls, while nevertheless remaining compatible with using a deterministic bus.

The invention is not limited to the above embodiment, but on the contrary covers any variant coming within the ambit defined by the claims.

In particular, although an automatic method is described herein for adjusting the H∞ control, it is naturally possible for the H∞ control to be adjusted in any other manner.

What is claimed is:

1. A method of managing steering control of a steerable portion of an aircraft undercarriage, having an electromechanical steering actuator and using a reference model established for control of the undercarriage and steering actuator, a control synthesizer that synthesizes H∞ (H-infinity) control, weighting filters, a servo control system, and an optimizer algorithm that modifies parameters of the weighting filters to cause the servo control system to respond closely to the reference model, the method comprising:

implementing servo-control of the electromechanical steering actuator on an angular position setpoint, wherein the servo-control implements a robust control relationship of the H∞ (H-infinity) type, wherein position and speed information needed for implementing the servo-control are delivered by means of a fieldbus of deterministic type to a computer that executes that implementation, and wherein the H∞ control is synthesized automatically by means of the optimization algorithm that determines the parameters of the weighting filters of the control relationship, whereby the response of the steering control as servo-controlled in this way complies with a response of the reference model.

2. A method according to claim 1, wherein the servo-control includes prefiltering of the angular position setpoint seeking to smooth it prior to being compared with the position information.

3. A method according to claim 1, wherein the prefiltering is performed by means of a discrete interpolator of a transfer function.

4. A method according to claim 1, wherein the servo-control is implemented in a computer located in the aircraft, the computer delivering a current setpoint that is conveyed to the electromechanical actuator via the fieldbus.

* * * * *